March 7, 1950 L. C. KELSEY 2,499,996
PHOTOTUBE AMPLIFICATION
Filed Feb. 12, 1949
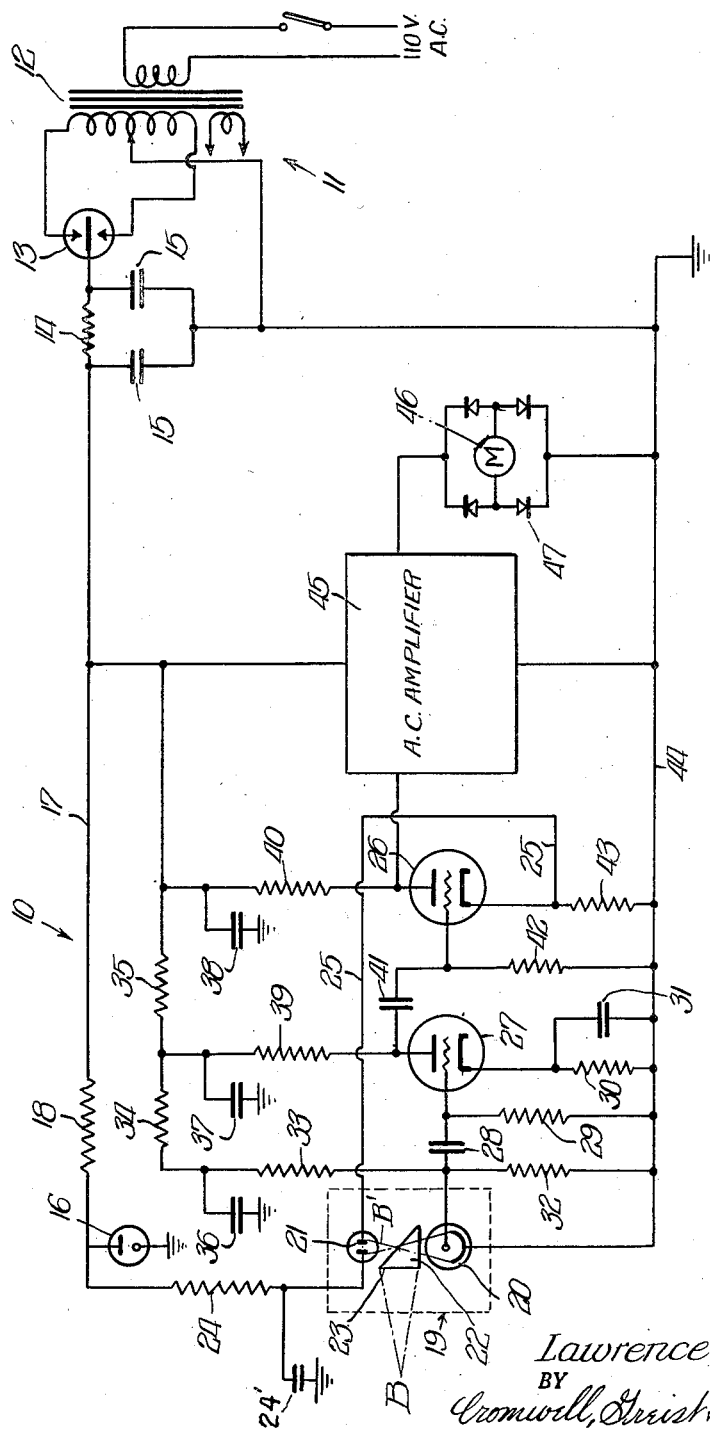
INVENTOR.
Lawrence C. Kelsey,
BY
Cromwell, Greist & Warden
Attys.

Patented Mar. 7, 1950

2,499,996

UNITED STATES PATENT OFFICE 2,499,996

PHOTOTUBE AMPLIFICATION

Lawrence C. Kelsey, Chicago, Ill., assignor to W. M. Welch Manufacturing Company, Chicago, Ill., a corporation of Illinois Application February 12, 1949, Serial No. 76,141

11 Claims. (Cl. 250—214)

The present invention pertains to a novel method and apparatus or system for the amplification of linear, unidirectional photoelectrically derived voltages and, more particularly, to the amplification of such voltages by first modulating the same to impart an undulatory or sine wave characteristic thereto. The method and apparatus are of particular utility and value for application to laboratory or testing equipment in the detecting, observing, measuring, comparing, etc., of light manifestations, also in various applications as a practical control instrumentality, in which the variation in such a subject light source serves to institute any of a large number of different kinds of control operation.

Various devices and circuits have heretofore been proposed for the amplification of photoelectrically derived potentials. It is possible to amplify these small voltages by certain well-known, direct current type amplifiers. However, various commonly recognized disadvantages of the D.C. type amplifier render it unsuited to the above mentioned end. It is decidedly preferable to build up the potential which is set up in a phototube or equivalent photo-sensitive device by means of the equally well-known alternating-current type of amplifier. Hence it follows that in order to adapt the linear phototube voltage for amplification in the A.C. amplifier equipment, it is first necessary that it be modulated to exhibit an alternating or undulatory sine wave characteristic.

Various expedients have been evolved for the last named purpose. Thus certain types of mechanical, shutter-like instrumentalities have been proposed for the purpose of interrupting at the desired frequency the light rays impinging the photo-sensitive device. Other proposals rely on electrical or magnetic modulation of the linear phototube voltage, operating on the principle of periodically interrupting the flow of electrons between the cathode and anode of the phototube by imposing a variable magnetic field on the electron stream therein or by one type or another of electrical modulation.

The present invention applies a principle distinct from those underlying the aforesaid types of mechanically, electrically or magnetically modulated phototube amplification circuits, namely, a principle of intermittent "optical" or light modulation of the light sensitive device or phototube in question. Briefly considered, a separate, intermittently energized, phototube-modulating lamp or equivalent light source, which is entirely distinct from the external subject light source or manifestation which is to be measured, observed, compared or made use of by the phototube circuit, is employed to periodically nullify the effect on the phototube output of light from said external, subject light source. It accomplishes this primarily by initiating a periodically recurrent phototube-modulating voltage of desired frequency, which is operative at a given amplification stage of the phototube circuit to drop the gain at that stage to zero at the desired periodic intervals. However, the beam from said modulating source is also effective, simultaneously with this periodic blanking out of the amplifier, to render the phototube insensitive to light from the subject source at the instant the modulator source is in operation.

It is a general object of the invention to provide an improved and simplified measuring circuit and apparatus for amplifying photoelectrically originated or like voltages of a low order of magnitude, such as are derived in the photoelectric observation and measurement of light of low and variable intensity, in which the normally linear, unidirectional current initiated by a photo-sensitive device when energized by a subject source of light under observation is modulated at any desired, constant frequency by a further, modulating light source in a manner to impart an undulatory or alternating, sine wave characteristic thereto, thus adapting the photoelectric voltage for further alternating current amplification.

Another object is to provide a method and circuit of the foregoing description for the measurement of photoelectrically originated voltages of a low order of magnitude, in which the modulating light source thereof produces the aforesaid modulation of the photoelectric voltage both optically, by periodically blocking the subject light source in a fashion to render it ineffective on the phototube, and also by initiating a modulating, cut off voltage which is applied to a preliminary amplification stage of the phototube output circuit to blank out the circuit at said stage.

Another object of the invention is to provide an alternating-current amplifier combined with a light-modulated phototube circuit of the foregoing type to constitute a device or instrument which is adapted for use in many ways in the detecting, observation, measuring or analysis of radiated, reflected or transmitted light manifestations.

The foregoing statements are indicative in a general way of the nature of the invention, but other and more specific objects will be apparent to those skilled in the art upon a full understanding of the circuit, and the relation and operation of the components thereof.

A single embodiment of the invention is presented herein for purpose of exemplification, but it will be appreciated that the invention is susceptible of incorporation in other modified forms coming equally within the scope of the appended claims:

The drawing is a schematic layout of the apparatus or system which constitutes the subject matter of the invention, including a conventionalized wiring diagram of the phototube modulator circuit thereof and the power supply and amplifier units associated therewith.

Referring to the drawing, the present phototube amplifier circuit, generally designated 10, is energized by a steady current derived from a 110 volt line through a standard power pack 11 including the transformer 12, full wave rectifier 13, filter resistor 14 and electrolytic condensers 15. A conventional voltage regulator 16 is disposed in the power side 17 of the circuit and a regulator dropping resistor 18 is interposed between said regulator and the power pack 11.

The phototube and modulator unit of the present invention is generally designated by the reference numeral 19. It may be housed in a suitable casing and includes as its principal components a standard photoelectric cell or phototube 20 of well known type and a separate modulator lamp or light source 21. This source may be in the form of a conventional thermionic, gaseous discharge tube, such as the Thyratron or ignitron, or other suitable type of glow tube adapted to emit a relatively intense light of short duration when its gaseous contents are adequately ionized. Alternatively, the modulating function may be performed by a conventional incandescent lamp associated with a condenser and a source of alternating-current energizing voltage. The particular character of the source 21 is relatively unimportant. However, it should be understood that this modulating source is entirely separate and distinct from any external light source or manifestation which is to be detected, studied, measured, compared or put to use. The latter is herein referred to as a "subject" manifestation or source to distinguish the same from the modulator source 21.

The phototube and modulator unit 19 may also include a clear prism 22 of glass or plastic, against the collecting side 23 of which the subject external light beam B or other light emanation or manifestation to be detected, observed, studied, measured, or put to use is caused to impinge. Said light collecting side is preferably frosted or roughened to render the same translucent. As illustrated, prism 22 is positioned to be impinged by a modulator beam B' which periodically originates in the modulator source 21, at desired frequency.

Said source is energized from the voltage supply line 17 through a timing resistor 24 of appropriate value connected to one of the electrodes thereof. A grounded charging condenser 24' is connected between resistor 24 and lamp 21 for the purpose of causing high current discharge peaks of very short duration. Condenser 24' functions to recurrently build up a charge sufficient to ionize and discharge lamp 21. The other electrode of the modulator lamp is connected by the lead 25 directly with the cathode of the second pre-amplifier tube 26 in the phototube output circuit, the operation of which tube 26, in accordance with the present invention, will be hereinafter described in detail.

The phototube 20 is connected to the first amplifier tube 27 of the aforesaid phototube output amplifier circuit by a standard coupling arrangement including the coupling condenser 28 between the phototube anode and the grid of the first stage pre-amplifier tube 27, the grid leak resistor 29, the cathode resistor 30 and by-pass condenser 31. Voltage divider resistors 32 and 33, decoupling resistors 34 and 35, condensers 36, 37 and 38, and plate load resistors 39, 40 are provided in the respective pre-amplifier tube coupling circuits in an entirely conventional fashion. The plate of tube 27 is coupled to the grid of tube 26 by the condenser 41 and grid leak resistor 42, and a cathode resistor 43 for tube 26 is disposed between the input lead 25 from the modulator source to tube 26 and the grounded side 44 of the circuit.

The reference numeral 45 generally designates an alternating-current amplifier of well known type to which tube 26 is connected. Amplifier 45 is of a rating proper to build up the small modulated phototube voltages generated in the present circuit to a value suited for application to whatever type of apparatus or instrument, measuring, comparing, etc., it is desired to employ in conjunction with the present circuit or unit. For illustrative purpose, a D. C. meter 46 has been shown, equipped with a bridge type rectifier 47 to which the output of the amplifier 45 is fed. However, it is to be understood that various other types of indicating instrumentalities, also apparatus to be operated or controlled by the modulated and amplifier phototube potential, and the like, are contemplated by the present invention.

In operation, a steady current is supplied through timing resistor condenser 24, 24' which are chosen in proper values to cause the modulator glow lamp or discharge tube 21 to ionize periodically at desired frequency, for example, 60 cycles per second. Thus at intervals of that frequency the lamp 21 emits a beam B' of very short duration, which is, in fact, instantaneous in nature. This beam is of intensity sufficient that, when bent by prism 22, it optically blocks the subject light beam B impinging the roughened collector side 23 of said prism, hence conceals the effect of beam B on the phototube 20 at that instant. The modulator 21, timing or charging resistor condenser 24, 24' and other associated parts are chosen so that the modulator beam B' from source 21 actually will equal or exceed in total illumination the light B simultaneously impinging the prism 22.

However, the action of optically blocking the subject beam is but one of the functions of the modulator source. At the same instant that lamp 21 fires and emits beam B', it passes an instantaneous and substantial increment of current, with the result that the grid of the second stage pre-amplifier tube 26 is biased to cut-off condition. This is caused by the sudden flow of current, originating in phototube 20 due to the impingement of modulator beam B' on the cathode of said phototube, through resistor 43. Hence, the pre-amplifier circuit is prevented from passing any signal during this instantaneous period.

The modulator lamp 21 now extinguishes due to the inability of the circuit to supply enough current to maintain an ionizing condition of said lamp. As a result, the subject beam or source B is again allowed to be reflected internally of prism 22 onto the phototube cathode. During this instant the modulating or "blocking" current (i. e., over and above the normal tube current in source 21) ceases to flow through cathode resistor 43. Hence, pre-amplifier tube 26 is in condition to pass any phototube signal supplied to it by the preceding stage during this instant when modulator source 21 is extinguished.

The signal output of amplifier tube 26 is fed to A. C. amplifier 45, which is peaked for greatest amplification at the frequency of ionization and extinguishment of lamp 21. The amplifier output is then, in the illustrated embodiment, rectified and applied to meter 46 to afford a visible indication as to quantity, difference or color of the subject light manifestation B under observation.

It is evident from the above that the present amplifier system operates on a principle of modulating a normally linear phototube or other photoelectric voltage to impart an undulatory or alternating, sine wave characteristic of a constant, desired, basic frequency to the photo-cell output, using as a modulator a light source which alternately illuminates and extinguishes at a constant rate and connecting said modulator to the photo-cell output circuit to disable said circuit at the instant of modulator illumination, said modulator source at the same time causing the photocell itself to be rendered insensitive to the subject manifestation under observation at the instant of peak modulator illumination.

This arrangement is relatively free from critical or limiting factors. The type and values of timing resistor 24, condenser 24', cathode resistor 43, lamp 21 and other elements involved in the control of the cut-off current to the pre-amplifier may be selected quite arbitrarily. Practically the sole consideration of any moment is the suitability of these components to control factors such as the intensity and amount of illumination emanating from said lamp, the timing of the illuminating or firing of the latter, adequate biasing of tube 26 to cut-off condition, the recovery time of the amplifier units, etc.

Reference has been made in the foregoing description to visible light manifestations emanating from the subject and modulator sources B, B', respectively. However, it is evident that the wave length of the radiant energy involved is not controlling in the invention and that the system is adapted for applications in which the emanations from said sources are outside the visible range.

I claim:

1. In an amplifier circuit, a sensitive element adapted to generate an electrical potential when influenced by a subject source of radiant energy, a radiant energy-emitting modulator element operatively positioned to influence said sensitive element, means to periodically energize said modulator element at predetermined frequency to an emissive condition, and an output circuit for said sensitive element connected to said modulator element and operated thereby to cut-off condition during periods of emissivity of said modulator element, said modulator element further modulating the output of said sensitive element by periodically varying at said predetermined frequency the quantity of energy effective thereon.

2. In an amplifier circuit, a sensitive element adapted to generate an electrical potential when influenced by a subject source of radiant energy, an electrical, radiant energy-emitting modulator element operatively positioned to influence said sensitive element, means to periodically energize said modulator element at predetermined frequency to an emissive condition, including a source of electrical potential, a voltage supply line from said electrical source to said modulator element, and a timing resistor in said line, and an output amplifier circuit for said sensitive element connected to said modulator element and operated thereby to cut-off condition during periods of emissivity of said modulator element, said modulator element further modulating the output of said sensitive element by periodically varying at said predetermined frequency the quantity of energy effective thereon.

3. In an amplifier circuit, a sensitive element adapted to generate an electrical potential when influenced by a subject source of radiant energy, a radiant energy-emitting modulator element operatively positioned to influence said sensitive element, means to periodically energize said modulator element at predetermined frequency to an emissive condition, and an output circuit for said sensitive element including a thermionic tube having an electrode thereof connected to said modulator element and operated thereby to cut-off condition during periods of emissivity of said modulator element, said modulator element further modulating the output of said sensitive element by periodically varying at said predetermined frequency the quantity of energy effective thereon.

4. In an amplifier circuit, a sensitive element adapted to generate an electrical potential when influenced by a subject source of radiant energy, an electrical radiant energy-emitting modulator element operatively positioned to influence said sensitive element, means to periodically energize said modulator element at predetermined frequency to an emissive condition, including a source of electrical potential, a voltage supply line from said electrical source to said modulator element, and a timing resistor in said line, and an output amplifier circuit for said sensitive element including a thermionic tube having an electrode thereof connected to said modulator element and operated thereby to cut-off condition during periods of emissivity of said modulator element, said modulator element further modulating the output of said sensitive element by periodically varying at said predetermined frequency the quantity of energy effective thereon.

5. In a photoelectric amplifier circuit, a photosensitive element adapted to generate an electrical potential when exposed to a subject source of light, a light emitting modulator element positioned to direct light on said photo-sensitive element, means to periodically energize said modulator element to emissive condition at predetermined frequency, and an output circuit for said photo-sensitive element connected to said modulator element and operated by the latter to cut-off condition during periods of emissivity of said modulator element, and light controlling means operatively interposed between said elements and between said modulator element and subject light source, said modulator element being effective through said last named means to neutralize the effect of the subject source on said sensitive element during periods of emissivity of said modulator element.

6. In a photoelectric amplifier circuit, a photosensitive element adapted to generate an electrical potential when exposed to a subject source of light, a light emitting modulator element positioned to direct light on said photo-sensitive element, means to periodically energize said modulator element to emissive condition at predetermined frequency, and an output circuit for said photo-sensitive element including a thermionic tube having electrodes thereof connected to said sensitive element and modulator element and operated by the latter to cut-off condition during periods of emissivity of said modulator element.

7. In a photoelectric amplifier circuit, a photo-sensitive element adapted to generate an electrical potential when exposed to a subject source of light, a light emitting modulator element positioned to direct light on said photo-sensitive element, means to periodically energize said modulator element to emissive condition at predetermined frequency, an output circuit for said photo-sensitive element including a thermionic tube having electrodes thereof connected to said sensitive element and modulator element and operated by the latter to cut-off condition during periods of emissivity of said modulator element, and light controlling means operatively interposed between said elements and between said modulator element and subject light source, said modulator element being effective through said last named means to neutralize the effect of the subject source on said sensitive element during periods of emissivity of said modulator element.

8. A photoelectric measuring circuit comprising a photo-sensitive element adapted to generate a linear electrical potential under the influence of an independent and external subject light source, a light emitting modulator element, means to periodically energize said modulator element to an emissive condition at predetermined frequency, said photo-sensitive element being operatively positioned relative to said modulator element for impingement by light periodically emitted from the latter concurrently with light impinging the same from said subject source, whereby the quantum of electrical energy originating in said photo-sensitive element is periodically modulated at said predetermined frequency, means to amplify said modulated voltage, and measuring means operatively connected to said amplifying means to afford an indication which is accurately indicative of the intensity of light from said source.

9. A photoelectric amplifier circuit comprising a photo-sensitive element adapted to generate a linear electrical potential under the influence of a subject light source, a light emitting modulator element, means to periodically energize said modulator element to an emissive condition at predetermined frequency, and a pre-amplifier unit connected to the output of said photo-sensitive element including a thermionic tube having a pair of electrodes connected respectively to said photo-sensitive and modulator elements and biased to cut-off condition by the latter at said predetermined frequency, said photo-sensitive element being operatively positioned relative to said modulator element for impingement by light periodically emitted from the latter concurrently with light impinging the same from said subject source, whereby the quantum of electrical energy originating in said photo-sensitive element is periodically modulated at said predetermined frequency.

10. A photo-electric amplifier and meter circuit comprising, in combination with an alternating current amplifier and a measuring unit operatively connected to the output thereof, a photo-sensitive element connected to the input of said amplifier and adapted to generate a linear electrical potential under the influence of a subject light source, a light emitting modulator element, and means to periodically energize said modulator element to an emissive condition at predetermined frequency, said photo-sensitive element being operatively positioned relative to said modulator element for impingement by light periodically emitted from the latter concurrently with light impinging the same from said subject source, whereby the quantum of electrical energy originating in said photo-sensitive element is periodically modulated at said predetermined frequency.

11. A photo-electric amplifier circuit comprising, in combination with an alternating current amplifier, a photo-sensitive element adapted to generate a linear electrical potential under the influence of a subject light source, a light emitting modulator element, means to periodically energize said modulator element to an emissive condition at predetermined frequency, and a pre-amplifier unit connected to the output of said photo-sensitive element and feeding said alternating current amplifier, said unit including a thermionic tube having a pair of electrodes connected respectively to said photo-sensitive and modulator elements and biased to cut-off condition by the latter at said predetermined frequency, said photo-sensitive element being operatively positioned relative to said modulator element for impingement by light periodically emitted from the latter concurrently with light impinging the same from said subject source, whereby the quantum of electrical energy originating in said photo-sensitive element is periodically modulated at said predetermined frequency.

LAWRENCE C. KELSEY.

No references cited.